US008872511B2

(12) United States Patent
Manabe

(10) Patent No.: US 8,872,511 B2
(45) Date of Patent: *Oct. 28, 2014

(54) ANGLE OF ROTATION DETECTION DEVICE

(75) Inventor: Shizuo Manabe, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 271 days.

This patent is subject to a terminal disclaimer.

(21) Appl. No.: 13/377,969

(22) PCT Filed: Jun. 14, 2010

(86) PCT No.: PCT/JP2010/060009
§ 371 (c)(1),
(2), (4) Date: Dec. 13, 2011

(87) PCT Pub. No.: WO2011/010516
PCT Pub. Date: Jan. 27, 2011

(65) Prior Publication Data
US 2012/0139533 A1   Jun. 7, 2012

(30) Foreign Application Priority Data
Jul. 24, 2009   (JP) ................. 2009-173316

(51) Int. Cl.
*G01B 7/30* (2006.01)
*G01D 5/244* (2006.01)
*G01D 5/20* (2006.01)

(52) U.S. Cl.
CPC .......... *G01D 5/2073* (2013.01); *G01D 5/24495* (2013.01)
USPC .................................... 324/207.25

(58) Field of Classification Search
None
See application file for complete search history.

(56) References Cited

U.S. PATENT DOCUMENTS

| 5,012,169 A | 4/1991 | Ono et al. |
| 5,349,294 A | 9/1994 | Kasuboski |
| 5,677,607 A | 10/1997 | Sugiyama et al. |
| 6,906,491 B2 | 6/2005 | Matsuo et al. |

(Continued)

FOREIGN PATENT DOCUMENTS

| JP | A-02-264306 | 10/1990 |
| JP | A-04-036614 | 2/1992 |

(Continued)

OTHER PUBLICATIONS

Partial Translation of Office Action issued in Japanese Application No. 2011-523589 mailed Jan. 22, 2013.

(Continued)

*Primary Examiner* — Paresh Patel
(74) *Attorney, Agent, or Firm* — Oliff PLC

(57) ABSTRACT

An angle of rotation detection device includes an electrical angle detector (resolver and R/D converter) having the electrical angle of 360° set smaller than the mechanical angle of 360°, and providing a two-phase encoder signal corresponding to the electrical angle of a rotor; a two-phase encoder counter counting a two-phase encoder signal, and providing a digital value corresponding to the electrical angle, and a multiplication factor detector detecting which position of the mechanical angle the electrical angle indicated by the signal output from the detector corresponds to, based on a change of the count value from the two-phase encoder counter. Thus, there can be provided an angle of rotation detection device that can identify the position of the mechanical angle while using the two-phase encoder output.

5 Claims, 11 Drawing Sheets

(56) References Cited

U.S. PATENT DOCUMENTS

| | | | |
|---|---|---|---|
| 7,294,988 B2 | 11/2007 | Ajima et al. | |
| 8,471,506 B2 * | 6/2013 | Manabe | 318/400.04 |
| 2003/0109974 A1 | 6/2003 | Ishihara | |
| 2004/0257027 A1 | 12/2004 | Matsuo et al. | |
| 2005/0212475 A1 | 9/2005 | Kakutani et al. | |
| 2006/0125439 A1 | 6/2006 | Ajima et al. | |
| 2006/0273247 A1 | 12/2006 | Sakamaki et al. | |
| 2008/0297078 A1 | 12/2008 | Iwasaki et al. | |

FOREIGN PATENT DOCUMENTS

| | | |
|---|---|---|
| JP | A-06-288791 | 10/1994 |
| JP | B2-08-001388 | 1/1996 |
| JP | A-09-219963 | 8/1997 |
| JP | A-11-101659 | 4/1999 |
| JP | A-11-299227 | 10/1999 |
| JP | A-11-337371 | 12/1999 |
| JP | A-2000-314639 | 11/2000 |
| JP | A-2003-137110 | 5/2003 |
| JP | A-2004-061157 | 2/2004 |
| JP | A-2004-242370 | 8/2004 |
| JP | A-2006-166677 | 6/2006 |
| JP | A-2006-238663 | 9/2006 |
| JP | A-2006-246601 | 9/2006 |
| JP | A-2006-262668 | 9/2006 |
| JP | A-2006-288152 | 10/2006 |
| JP | A-2008-259347 | 10/2008 |
| JP | A-2009-077481 | 4/2009 |
| JP | A-2009-222576 | 10/2009 |

OTHER PUBLICATIONS

International Search Report issued in Application No. PCT/JP2010/060009; Dated Aug. 31, 2010 (With Translation).

Oct. 18, 2012 Office Action issued in U.S. Appl. No. 12/915,429.

Mar. 21, 2013 Notice of Allowance issued in U.S. Appl. No. 12/915,429.

* cited by examiner

EXAMPLE: 10-BIT TWO-PHASE ENCODER COUNTER

ANGLE OF ROTATION DETECTION DEVICE

TECHNICAL FIELD

The present invention relates to angle of rotation detection devices, particularly an angle of rotation detection device having an angle corresponding to one period of an output signal set smaller than the mechanical angle of 360°.

BACKGROUND ART

A motor driving system is incorporated in a vehicle such as an automobile or hybrid vehicle with an electric motor as well as other electric apparatus employing a motor. For such a motor driving system, an angle of rotation detection device detecting the angle of rotation of the motor is employed.

For example, Japanese Patent Laying-Open No. 2009-77481 (Patent Literature 1) teaches the usage of a resolver for a rotation detecting sensor and an R/D (Resolver/Digital) converter that converts the output from the resolver into a digital value to increase or decrease a count value.

CITATION LIST

Patent Literature

PTL 1: Japanese Patent Laying-Open No. 2009-77481
PTL 2: Japanese Patent Laying-Open No. 2004-242370
PTL 3: Japanese Patent Laying-Open No. 2008-259347
PTL 4: Japanese Patent Laying-Open No. 11-337371
PTL 5: Japanese Patent Laying-Open No. 2004-61157
PTL 6: Japanese Patent Laying-Open No. 2000-314639

SUMMARY OF INVENTION

Technical Problem

Motor control is carried out basically using an electrical angle that changes according to the number of pole pairs. For example, a motor with one pair of poles has a matching mechanical angle and electrical angle. However, in the case of a motor with two pairs of poles, the electrical angle will repeat twice the change from 0° to 360° corresponding to one change of the mechanical angle from 0° to 360°. This means that, at a motor with two pairs of poles, it cannot be identified by just an output of 0°-360° of the electrical angle whether it corresponds to 0°-180° or 180°-360° of the mechanical angle.

In recent years, there are demands for higher torque, smaller size, and smooth controllability on motors directed to automobiles and the like. The number of pole pairs in a motor may possibly increase from 2 to 4 pairs, 5 pairs, or the like. In such a case, a resolver having a multiplication factor of angle of 2, 4, or 5 (also denoted as 2×, 4×, and 5×, respectively) is generally used. As used herein, a "multiplication factor of angle" is the ratio of the angle of one cycle of the resolver output (generally, electrical angle θe) to the actual mechanical angle θm of the resolver. Namely, the relationship of "mechanical angle θm=electrical angle θe/multiplication factor of angle N" is established. Since the multiplication factor of angle is a multiple, not an angle, this multiplication factor of angle may also be referred to as "multiplication factor" in the present specification.

When the angle of rotation sensor constituting the resolver or the like is reduced in size, or when the multiplication factor of angle is increased, the property may vary corresponding to the multiplication factor even if the electrical angle is the same due to insufficient machining accuracy. In the case where the sensor has such variation in property, the sensor should be used with the output corrected to exhibit ideal property.

FIG. 13 is a diagram to describe the correction of the property of a resolver with a multiplication factor of angle N×.

In FIG. 13, the horizontal axis represents the mechanical angle of the resolver whereas the vertical axis represents a count value corresponding to the mechanical angle. In the case where the property of the resolver is directly converted into a digital value, the output value will deviate from the ideal value. By carrying out correction so as to cause the output value to match the ideal value, the rotational speed or the like can be calculated properly.

Such a deviation in the output value will correspond to the 0°-360° position of the mechanical angle depending upon the machining accuracy or the like of the sensor.

In other words, the amount of deviation will differ depending upon which position of the mechanical angle the electrical angle corresponds to, even if the electrical angle takes the same value. Therefore, the correction value must be altered accordingly. Specifically, in the case where the electrical angle 0°-360° is associated with the multiplication factor of angle 2×, correction must be carried out upon confirming whether the output value (electrical angle) corresponds to mechanical angle 0°-180° or mechanical angle 180°-360°. In the case of the multiplication factor of angle 5×, the electrical angle indicated by the current output value may correspond to any of the five mechanical angles.

For the output of an R/D converter that converts the output of the resolver into a digital value, the output of a two-phase encoder is used. The two-phase encoder output includes an A-phase signal, a B-phase signal, and a Z-phase signal. The A-phase signal and B-phase signal are signals including a number of pulses corresponding to the angle of rotation. A phase difference is provided at the rising edge and falling edge of the pulse between the A-phase signal and B-phase signal. The rotation can be identified to be positive or negative depending upon the phase relationship between the A-phase signal and the B-phase signal. The Z-phase signal is output once for every one rotation of the electrical angle. Such interface is widely employed in the field of motor control. A typical two-phase encoder counter that counts in response to reception of a two-phase encoder output allows the electrical angle to be recognized, but not the mechanical angle.

An object of the present invention is to provide an angle of rotation detection device allowing the position of the mechanical angle to be recognized while employing a two-phase encoder output.

Solution to Problem

According to an aspect of the present invention, an angle of rotation detection device includes an angle detector having an angle corresponding to one period of an output signal set smaller than a mechanical angle of 360°, a counter providing a digital value corresponding to an output signal of the angle detector, and a multiplication factor detector detecting which position of the mechanical angle the angle indicated by the signal output from the angle detector corresponds to based on a change of the count value of the counter.

Preferably, the angle detector is an electrical angle detector having the electrical angle of 360° set smaller than the mechanical angle of 360°, providing a two-phase encoder signal corresponding to the electrical angle of a rotor. The counter is a two-phase encoder counter counting a two-phase encoder signal to output a digital value corresponding to the electrical angle. The multiplication factor detector detects, based on a change of the count value from the two-phase encoder counter, which position of the mechanical angle the electrical value indicated by the signal output from the electrical angle detector corresponds to.

Preferably, the multiplication factor detector generates a count value that is a high order bit of the two-phase encoder counter further extended to a value corresponding to the mechanical angle of 360°, and outputs the extended count value.

Further preferably, the electrical angle detector includes a resolver having the electrical angle of 360° sets smaller than the mechanical angle of 360°, and a resolver/digital converter converting a signal from the resolver into a digital value. The resolver/digital converter outputs a two-phase encoder signal including an A-phase signal, a B-phase signal and a Z-phase signal.

Further preferably, the two-phase encoder counter counts up or counts down according to the A-phase signal and the B-phase signal, and clears the count value when the Z-phase signal is input. The multiplication factor detector counts up the extended count value, when the count value of the two-phase encoder, immediately preceding a clearing of the count value of the two-phase encoder performed during an increase operation of the count value of the two-phase encoder, exceeds a threshold value.

Further preferably, the electrical angle detector also includes a sensor detecting a reference position of the mechanical angle. The two-phase encoder counter counts up or counts down according to the A-phase signal and B-phase signal, and clears the count value according to an output from the sensor. The multiplication factor detector clears the extended count value according to an output of the sensor.

Further preferably, the two-phase encoder counter counts up or counts down according to the A-phase signal and the B-phase signal, and clears the count value when a Z-phase signal is input. The angle of rotation detection device includes a Z-phase error detector determining whether the count value from the two-phase encoder counter at the time of input of a Z-phase signal is within a predetermined range corresponding to an error timing, and a Z-phase signal error determination unit counting the number of input Z-phase signals when a determination is made of being within the predetermined range by the Z-phase error detector, and clearing the extended count value held by the multiplication factor detector when the number of input Z-phase signals exceeds an error count threshold value.

Preferably, the angle detector outputs a signal indicating completion of one period for every predetermined angle as an output signal. The counter includes a rotor position detector counting up the count signal based on a clock signal during a period of time starting from an input of the output signal to the input of the next output signal. The angle of rotation detection device further includes a Z-phase error detector determining whether the count value of the counter at the time of input of the output signal is within a predetermined range corresponding to an error timing, and a Z-phase error determination unit counting the number of input output signals when a determination is made of being within the predetermined range by the Z-phase error detector, and clearing the extended count value held by the multiplication factor detector when the number of input output signals exceeds an error count threshold value.

Preferably, the angle of rotation detection device further includes an angle corrector performing a correction corresponding to a proper position of the mechanical angle on the digital value output from the counter, based on an output of the multiplication factor detector.

Advantageous Effect of Invention

Since the present invention allows the position of the mechanical angle to be recognized while using the two-phase encoder output, the property of the angle of rotation sensor can be corrected without having to modify significantly a conventional control system.

DESCRIPTION OF EMBODIMENTS

Figure 1:
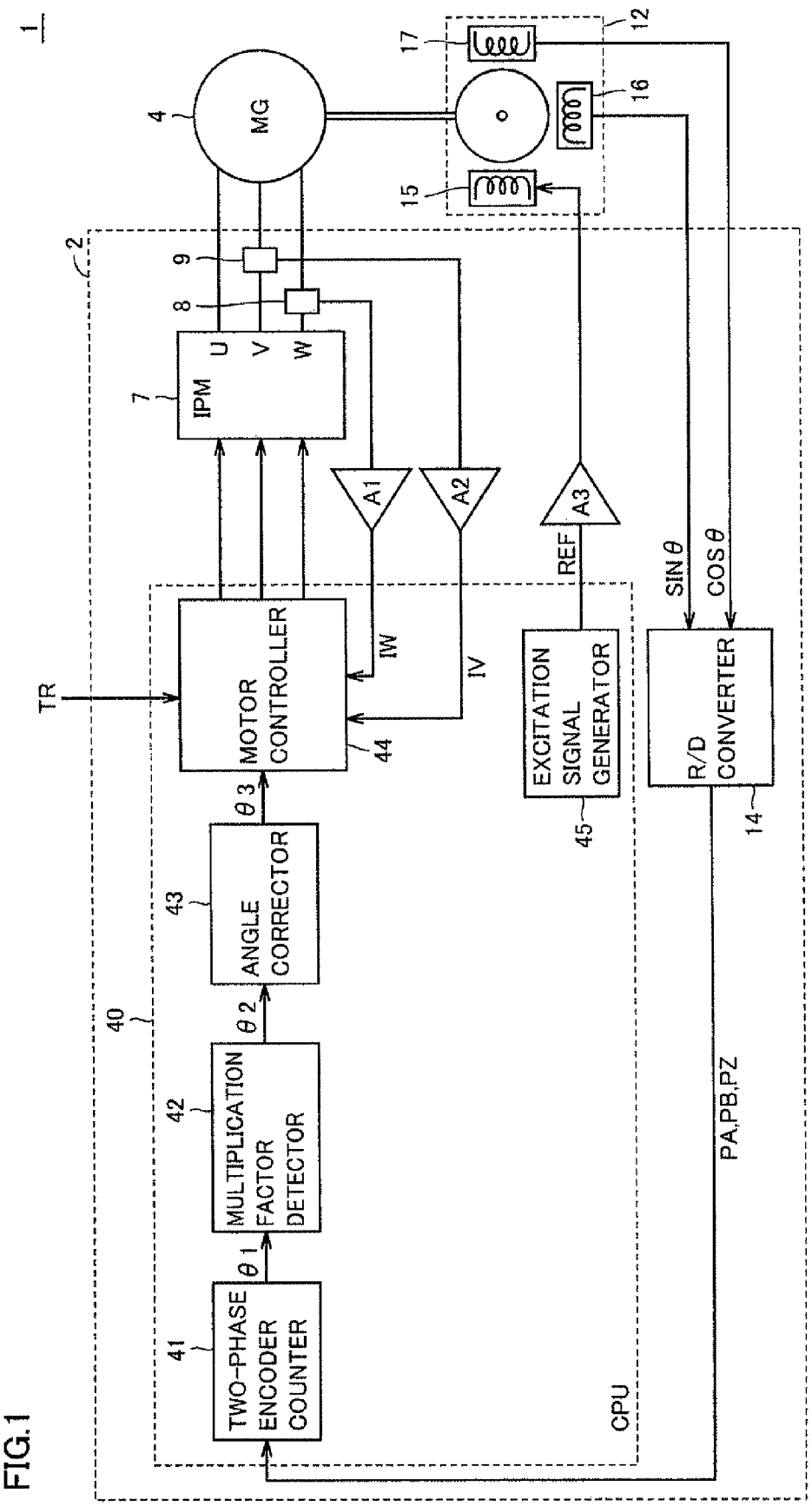
FIG. 1 is a block diagram of a vehicle 1 in which an angle of rotation detection device of the first embodiment is employed.

Embodiments of the present invention will be described in detail hereinafter with reference to the drawings. In the drawings, the same or corresponding elements have the same reference characters allotted, and description thereof will not be repeated.

First Embodiment

FIG. 1 is a block diagram representing a configuration of a vehicle 1 to which an angle of rotation detection device of the present invention is applied.

Referring to FIG. 1, vehicle 1 includes an inverter device 2, a motor generator 4, and a resolver 12 connected to the rotor shaft of the motor generator. In the case where vehicle 1 is an electrical vehicle, a hybrid vehicle, or a fuel cell vehicle, motor generator 4 may be used to drive the wheels. It is to be noted that motor generator 4 may also be used for another purpose.

Resolver 12 includes a rotor shaft having the shape of the outer circumference formed such that the distance to the center changes cyclically, a primary winding 15 provided at a stator, and two secondary windings 16 and 17 arranged at the stator to cause a phase difference of 90°. The outer shape of the rotor shaft is set such that the gap on the stator changes corresponding to a sine wave depending upon the angle. The number of the sine waves is determined corresponding to the multiplication factor of angle. When a signal of a sine wave sin ωt is applied to the primary winding of the resolver, signals sin ωt sin θ, and sin ωt cos θ modulated according to respective motor angle of rotation θ are obtained at the two secondary windings arranged so as to generate a phase difference of 90°.

Inverter device 2 includes a CPU (Central Processing Unit) 40, an IPM (Intelligent Power Module) 7, current sensors 8 and 9, and R/D (Resolver/Digital) converter 14. IPM 7 includes a power switching element such as an IGBT to control the current flow to the stator coil of the motor generator. The stator coil of the motor generator includes coils of the U-phase, V-phase and W-phase. Since the U-phase, V-phase and W-phase coils are arranged in wye configuration, the current of the U-phase can be obtained through calculation by measuring the currents of the V-phase and W-phase through current sensors 8 and 9.

Inverter device 2 further includes amplifiers A1 and A2 amplifying the output of current sensors 8 and 9, respectively, and an amplifier A3 exciting the primary winding of the resolver based on an excitation reference signal Ref from CPU 40.

CPU 40 obtains a count value θ1 corresponding to electrical angle θe by counting the two-phase encoder signal output from R/D converter 14. The two-phase encoder signal includes an A-phase signal PA, a B-phase signal PB, and a Z-phase signal PZ. CPU 40 further counts corresponding to the multiplication factor of angle to obtain a count value θ2 corresponding to mechanical angle θm. CPU 40 calculates a value θ3 having the property variation caused by insufficient machining accuracy of the resolver corrected based on count value θ2, and uses this corrected value θ3 for motor control.

Such an operation of CPU 40 may be implemented by software or by hardware. CPU 40 includes a two-phase encoder counter 41 counting up/down according to A-phase signal PA and B-phase signal PB, and clearing the count value according to Z-phase signal PZ, a multiplication factor detector 42 providing a count value θ2 corresponding to the mechanical angle in view of the multiplication factor of angle according to change in count value θ1 corresponding to the electrical angle output from two-phase encoder counter 41, an angle corrector 43 providing a count value θ3 corresponding to an electrical angle corrected based on count value θ2, and a motor controller 44 providing a 3-phase PWM signal of the U, V, and W-phases based on count value θ3 and torque command value TR, and motor current values IV, IW. The IGBT in IPM 7 is ON/OFF controlled based on the 3-phase PWM signal of the U, V, and W-phases to apply a current to motor generator MG.

The rotor shaft of resolver 12 is mechanically coupled to motor generator MG. An excitation sine wave signal of 10 kHz, for example, generated by excitation signal generator 45 realized by a D/A converter and the like in CPU 40 is amplified by current amplifier A3 to be applied to resolver primary winding 15.

Resolver 12 is a rotary transformer. A modulated sine wave of 10 kHz, for example, is induced at a SIN winding 16 and a COS winding 17 of the secondary side, according to a rotation of motor generator MG. The signal applied to R/D converter 14 from SIN winding 16 and a COS winding 17 is converted into a digital signal by R/D converter 14. Two-phase encoder output signals PA, PB and PZ are output corresponding to a change in the digital value.

The V-phase and W-phase current values of IPM 7 are detected at current sensors 8 and 9, and applied to the input of an A/D converter not shown of CPU 40 via buffer amplifiers A1 and A2. A corresponding digital value is applied to motor controller 44.

Based on a torque command. TR transmitted through communication by an ECU of a higher level (for example, a hybrid ECU in a hybrid vehicle), corrected electrical angle θ3, and current values IV, IW, motor controller 44 carries out dq axis calculation to determine the energizing duty ratio by comparison with a PWM timer.

Figure 2:
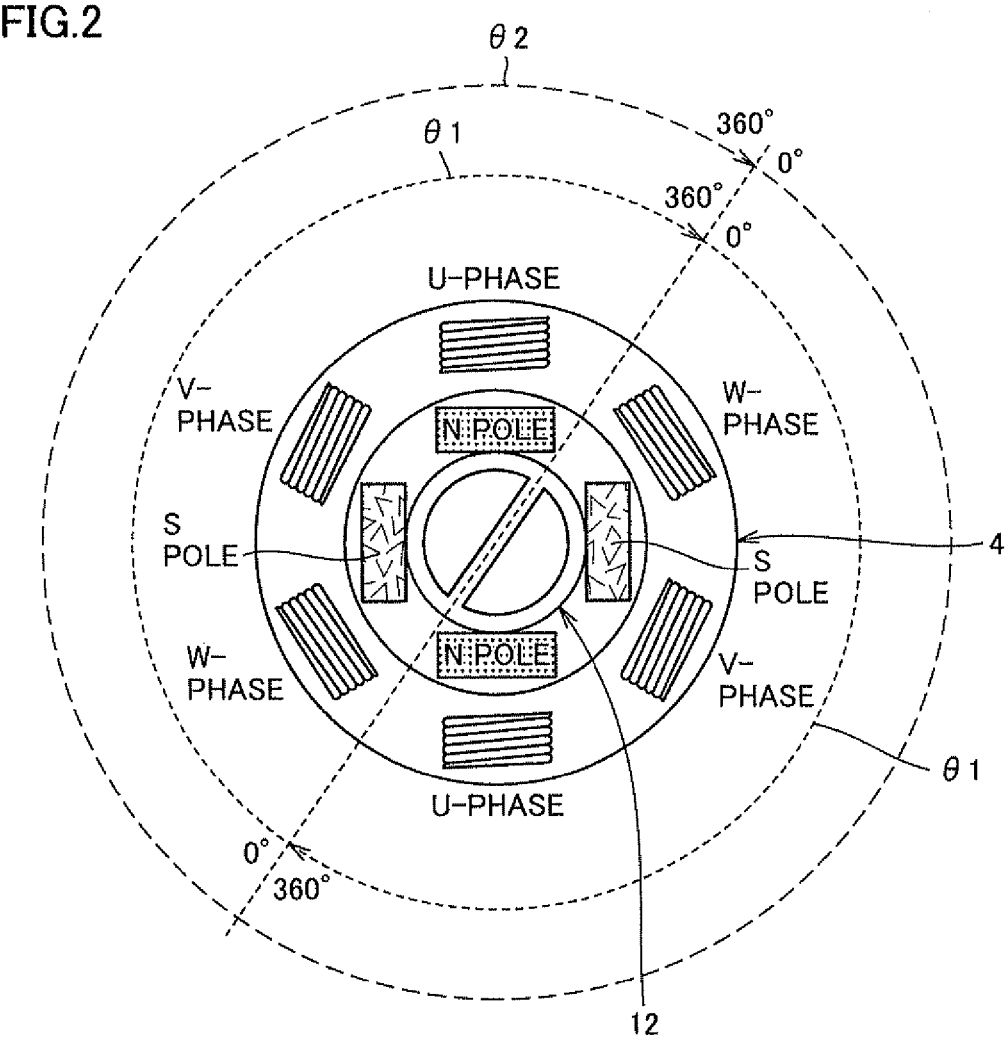
FIG. 2 is a diagram to describe a multiplication factor of angle of a resolver.

FIG. 2 is a diagram to describe the multiplication factor of angle of the resolver.

By way of example, a resolver with a multiplication factor of angle 2× will be described with reference to FIG. 2. FIG. 2 shows the state of a resolver 12 having a multiplication factor of angle 2× attached to a motor generator 4 having 3 phases and 2 pairs of poles. Motor generator 4 includes two U-phase coils, two V-phase coils and two W-phase coils at the stator, and two pairs of N and S poles of permanent magnets at the rotor. Resolver 12 is selected to have a multiplication factor of angle 2× to match the two pairs of poles of motor generator 4. By such a selection, only electrical angle θe is to be taken into account in motor control. Therefore, control can be simplified.

When the rotor of motor generator 4 makes a half-turn to 0°-180° of mechanical angle θm, the electrical angle θe output from resolver 12 changes to 0°-360°. Then, when the rotor of motor generator 4 makes a half turn to 180°-360° of mechanical angle θm, the electrical angle θe output from resolver 12 further changes to 0°-360°.

In order to output an electrical angle signal of the same accuracy when the multiplication factor of angle of the resolver is increased, the size of the resolver must be increased as long as the element machining accuracy is not set higher. Furthermore, if the element machining accuracy is identical in the case where the resolver is reduced in size, the accuracy of the electrical angle signal will become lower. Therefore, one approach is to use the resolver with the output corrected.

However, in the example of FIG. 2, it is expected that that the deviation in the property of the resolver will differ between the electrical angle corresponding to mechanical angle 0°-180° and the electrical angle corresponding to mechanical angle 180°-360°. This is because the deviation in property originates from the offset of the rotor in the resolver, machining variation of the outer circumference of the rotor, and the like. For example, at a VR (Variable Reluctance) resolver with a multiplication factor of angle 2×, having the rotor worked such that the gap (distance) between the rotor and stator varies corresponding to a sine wave, the worked face of the rotor corresponding to mechanical angle 0°-180° and the worked face of the rotor corresponding to mechanical angle 180°-360° may differ in accuracy.

Therefore, correction of the electrical angle must be performed corresponding to the mechanical angle. Specifically, even in the case of correcting the output value of the same electrical angle 10°, the correction value must be altered depending upon whether the mechanical angle is 10° or 190°. To this end, the present embodiment is directed to extending the rotor position detection feature of the resolver in accordance with the multiplication factor of angle to obtain the mechanical angle.

Figure 3:
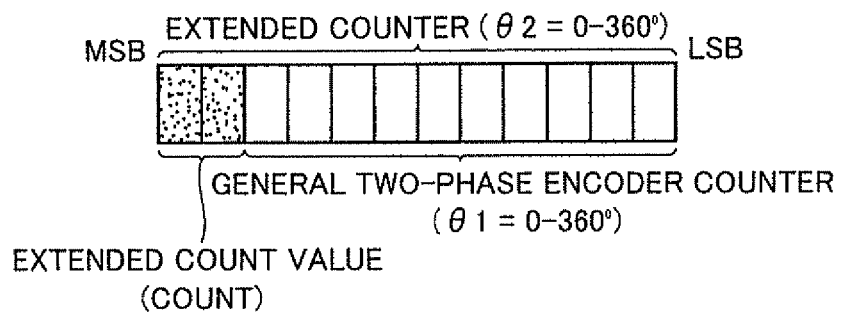
FIG. 3 is a diagram to describe bit extension of a two-phase encoder counter according to an embodiment.

FIG. 3 is a diagram to describe bit extension of a two-phase encoder counter according to the present embodiment.

Referring to FIG. 3, it is assumed that a 10-bit counter is employed as a general two-phase encoder counter. In this case, two-phase encoder counter 41 of FIG. 1 is a 10-bit counter. The range of electrical angle 0°-360° is indicated by the count value of 10 bits.

The mechanical angle can be obtained by extending and counting the high order bit of the 10-bit counter according to the level of the multiplication factor of angle. For example, in the case where the multiplication factor of angle is 2×, only one bit is required for the extended bit since only the two states of 0 and 1 is to be specified. In the case where the multiplication factor of angle is 5×, for example, the five states of 0-4 (000, 001, 010, 011, 100) must be specified. Therefore, three bits are required for the extended bit. The count corresponding to the extended bit is carried out at multiplication factor detector 42 shown in FIG. 1.

Therefore, the count value of the general two-phase encoder counter is count value θ1 corresponding to electrical angle θe=0°-360°. The extended count value of the counter is count value θ2 corresponding to mechanical angle θm=0°-360°.

Thus, by identifying the count value corresponding to the mechanical angle, correction for the property deviation of the resolver can be performed. Correction for the property deviation is carried out at angle corrector 43 shown in FIG. 1.

For example, correction for property deviation can be performed by causing learning when the motor generator is rotated. Correction can be performed by applying the method disclosed in Japanese Patent Laying-Open No. 2004-242370, for example, relative to the mechanical angle. Specifically, the average rate of increase of the count value of the two-phase encoder counter during the defined time is obtained for the first rotation (0°-360°) of the mechanical angle. Then, at the second rotation (0°-360°) of the mechanical angle, an estimated value of the two-phase encoder counter is calculated based on the obtained average rate of increase. When the estimated value and the value of the two-phase encoder counter in practice (actual value) are within a predetermined range, the estimated value is employed as the corrected value. In the case where the estimated value and the actual value of the two-phase encoder counter are outside the predetermined range, ½ the reference value is added to or subtracted from the actual value to be employed as the corrected value.

Figure 4:
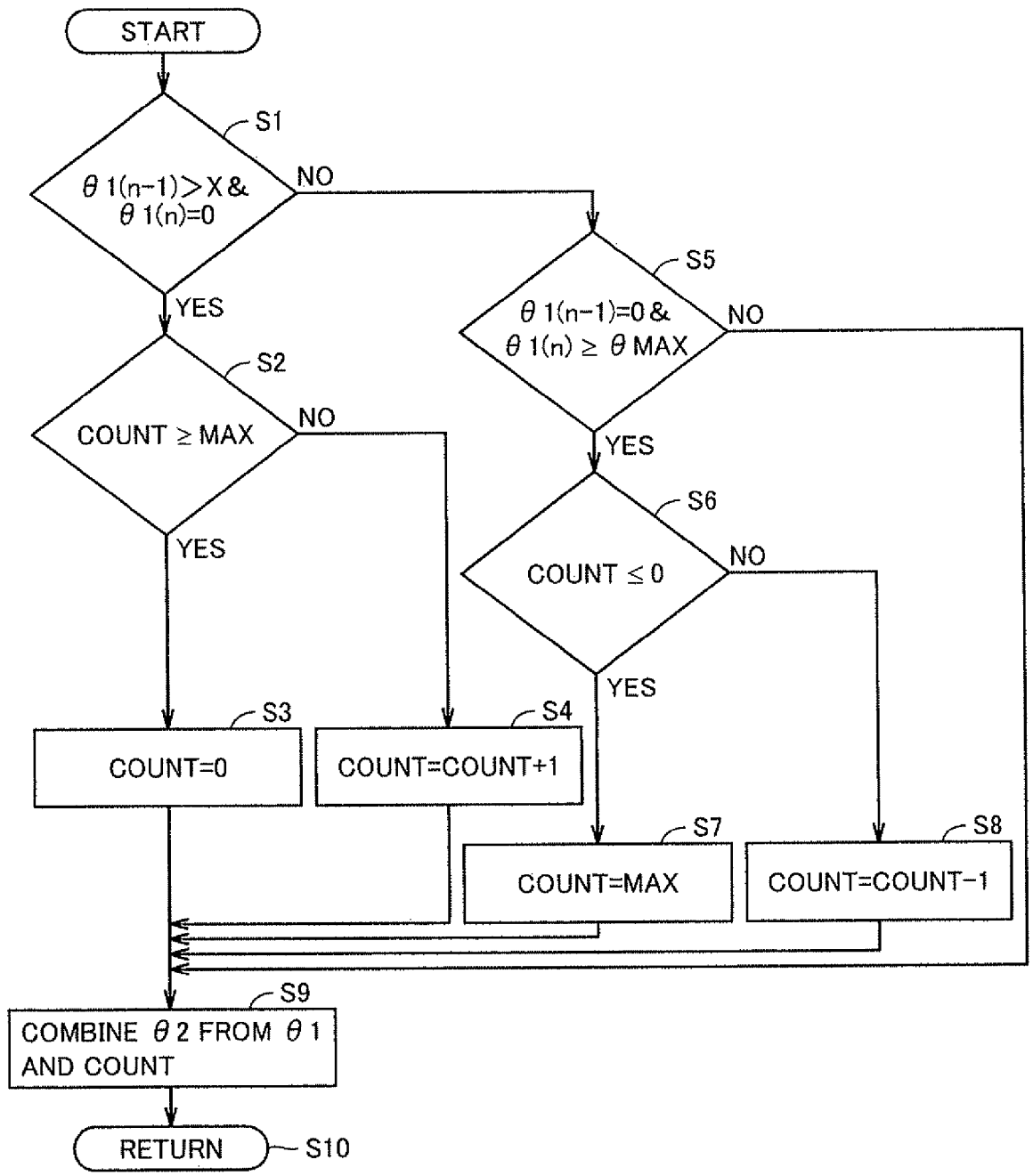
FIG. 4 is a flowchart of count control of an extended bit of a two-phase encoder counter executed by a CPU 40 according to the first embodiment.

FIG. 4 is a flowchart to describe the count control of the extended bit of the two-phase encoder counter executed at CPU 40 of the first embodiment. This process corresponds to the process executed at multiplication factor detector 42 of FIG. 1.

The process of the flowchart of FIG. 4 is invoked to be executed from a predetermined main routine every time the count value of the two-phase encoder counter of FIG. 1 (the count value prior to extension) changes.

At step S1, a determination is made as to whether θ1 (n−1)>X, and θ1 (n)=0 is established or not. θ1 (n) is the count value of two-phase encoder counter 41 at the n-th cycle, and corresponds to the electrical angle at the point in time corresponding to the n-th cycle of execution of the flowchart shown in FIG. 4. θ1 (n−1) is the count value of two-phase encoder counter 41 at the (n−1)th cycle, and corresponds to the electrical angle at the point in time corresponding to the (n−1)th cycle of execution of the flowchart shown in FIG. 4. X indicates the threshold value, which will be described afterwards in association with FIG. 6.

The condition at step S1 is based on a determination as to whether, when count value θ1 (n) is cleared to zero in response to an input of a Z-phase signal to two-phase encoder counter 41, the count value θ1 (n−1) of one preceding cycle is larger than threshold value X or not. When the condition is established, control proceeds from step S1 to step S2. This corresponds to the case where the count value is cleared during a count-up operation of two-phase encoder counter 41. The extended bit must be counted up in such a case.

At step S2, a determination is made as to whether the count value COUNT of the extended bit is greater than or equal to a maximum value MAX corresponding to the multiplication factor of angle. Maximum value MAX takes a 1-bit binary of 1 and a 3-bit binary of 100 when the resolver corresponds to multiplication factor of angle 2× and multiplication factor of angle 5×, respectively.

When the count value COUNT is greater than or equal to maximum value MAX at step S2, control proceeds to step S3 to set count value COUNT=0. When the count value COUNT has not reached maximum value MAX, control proceeds to step S4 where 1 is added to count value COUNT. Thus, the extended bit section shown in FIG. 3 is counted up.

When the condition is not established at step S1, control proceeds to step S5 where a determination is made as to whether θ1 (n−1)=0 and θ1 (n)≥θMAX are established or not. θ1 (n) is the count value of two-phase encoder counter 41 at the nth cycle. The value corresponds to the electrical angle at the point in time corresponding to the nth cycle. θ1 (n−1) is the count value of two-phase encoder counter 41 at the (n−1) th cycle. The value corresponds to the electrical angle at the point in time corresponding to the (n−1)th cycle. θMAX is the count value of two-phase encoder counter 41 corresponding to the maximum value of the electrical angle.

The condition at step S5 is based on the determination as to whether, when count value θ1 (n−1) is cleared to zero in response to an input of a Z-phase signal to two-phase encoder counter 41, count value θ1 (n) corresponding to 1 succeeding cycle is greater than or equal to θMAX. When this condition is established, control proceeds from step S5 to step S6. This corresponds to the case where two-phase encoder counter 41 is decremented following the setting to zero. In this case, the count value COUNT of the extended bit must be counted down.

At step S6, a determination is made as to whether count value COUNT of the extended bit is less than or equal to zero. When count value COUNT is less than or equal to zero at step S6, control proceeds to step S7 where count value COUNT=MAX is set. In the case where count value COUNT is larger than zero, control proceeds to step S8 where 1 is subtracted from count value COUNT. Thus the count down of the extended bit section shown in FIG. 3 is carried out.

Following the execution of any of steps S3, S4, S7 and S8, control proceeds to step S9. At step S9, an extended count value θ2 corresponding to mechanical angle θm described with reference to FIG. 3 is combined from θ1 that is the output value of two-phase encoder counter 41 and count value COUNT corresponding to the extended bit.

After count value θ2 is obtained at step S9, control proceeds to step S10 to return to the main routine.

Figure 5:
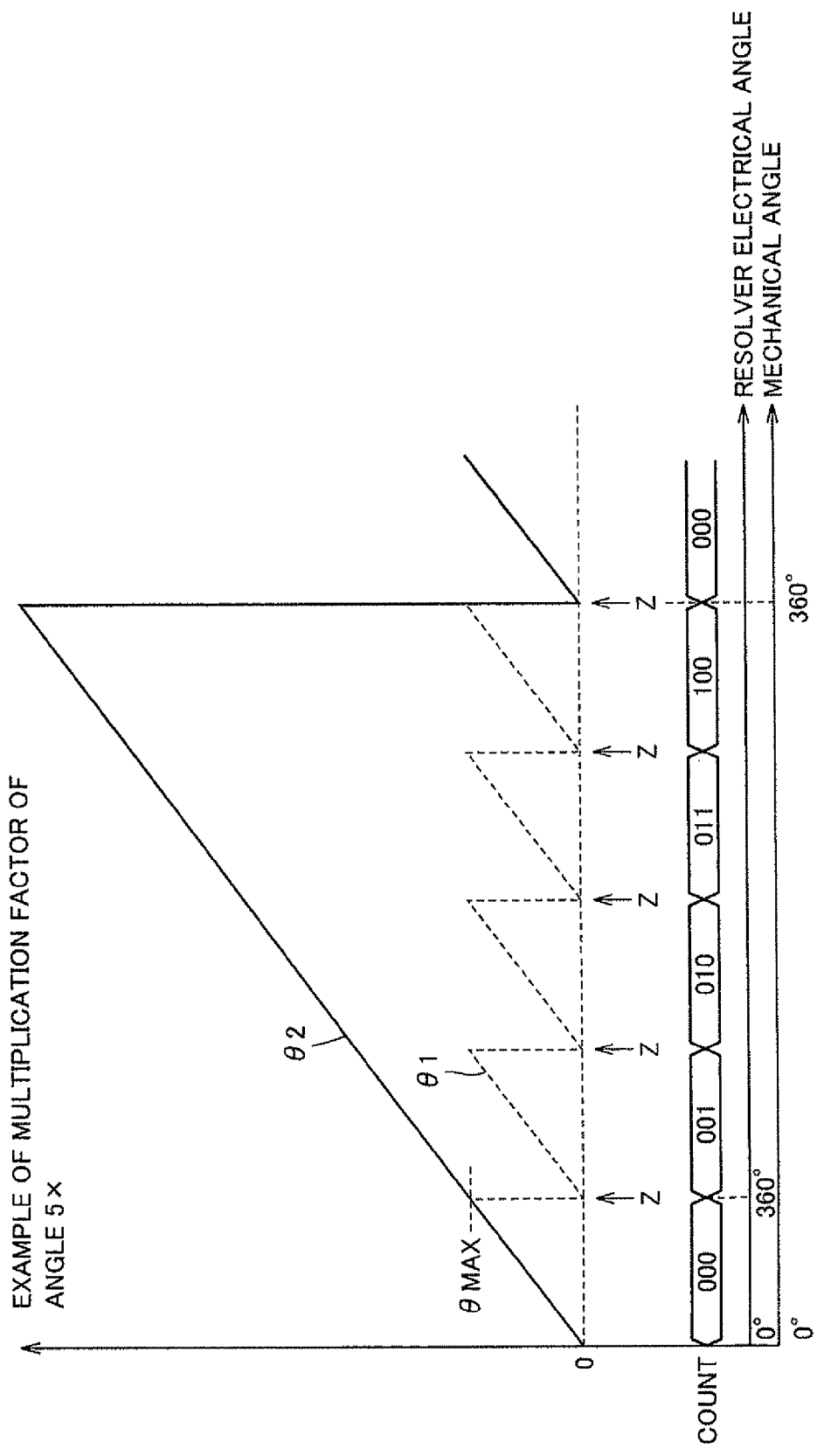
FIG. 5 is a waveform diagram representing an exemplified change of the count value from a counter when a resolver of multiplication factor of angle 5× is used.

FIG. 5 is a waveform diagram representing an example of a change in the count value of the counter in the case where a resolver of multiplication factor of angle 5× is employed.

Referring to FIG. 5, the mechanical angle (0°-360°) is plotted along the horizontal axis. Count value COUNT is counted up every time the electrical angle varies from 0°-360°. Count value θ1 corresponding to the electrical angle repeatedly changes from zero to θMAX. A Z-phase signal is input at the point in time the electrical angle attains 360°. In response, count value θ1 attaining θMAX is cleared to zero.

At this point in time, count value COUNT corresponding to the extended bit has 1 added (step S4 in FIG. 4).

Thus, count value θ1 is cleared to zero every time a Z-phase signal is input. Count value COUNT is counted up as 000→001→010→011→100 in binary. Since MAX in the flowchart of FIG. 4 is 100 when the multiplication factor of angle is 5×, count value COUNT is cleared to 000 in response to the next input of a Z-phase signal after COUNT=100 (step S3).

FIG. 5 also represents that count value θ2 corresponding to a mechanical angle is obtained based on count value θ1 and count value COUNT.

Figure 6:
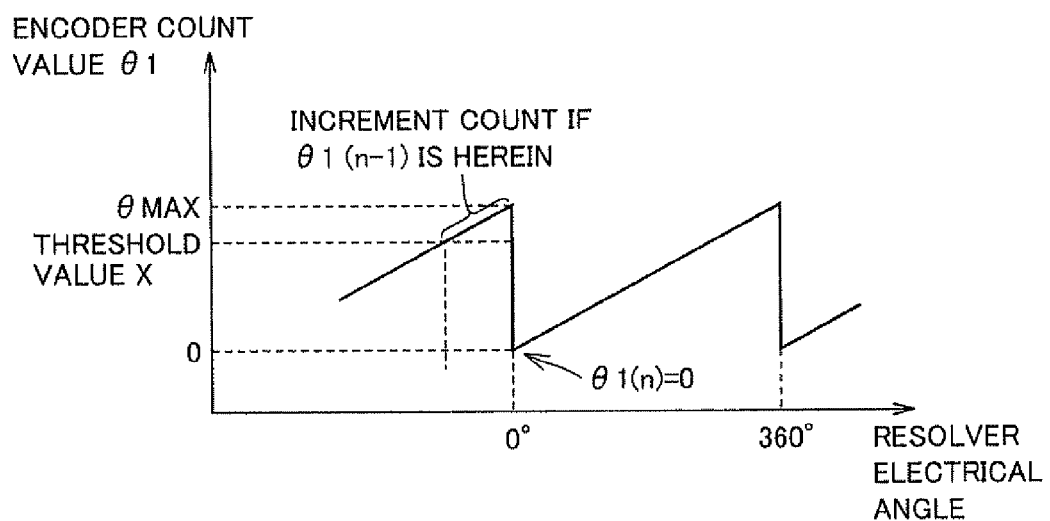
FIG. 6 is a waveform diagram with the change preceding and succeeding a north marker of the count value during increase at the counter enlarged.

FIG. 6 is a waveform diagram representing the change preceding and succeeding the north marker of the count value during counter increment. The Z-phase signal of the two-phase encoder output is also referred to as a north marker (NM). In FIG. 5, θ1 varies up to θMAX, and count COUNT value is added at the change to zero immediately thereafter. Since the Z-phase signal may exhibit deviation in timing, the process is carried out such that some deviation is tolerable.

FIG. 6 represents a threshold value X employed at step S1 of FIG. 4. By the condition at step S1, count value COUNT is counted up as long as θ1 exceeds threshold value X even if the count has not reached θMAX. Specifically, θ1 (n)=zero is established when a Z-phase signal is input to two-phase encoder counter 41 shown in FIG. 1, or when two-phase encoder counter 41 attains maximum value θMAX and the addition set forth below is carried out in response to a change in the A-phase and B-phase signal.

By performing the process of step S1, count value COUNT can be counted up even when a Z-phase signal is input prior to attaining maximum value θMAX, depending on the situation. Accordingly, a count value θ2 properly corresponding to a mechanical apparatus can be obtained.

The position of the mechanical angle can be identified while employing the output of a two-phase encoder. Therefore, the property of the angle of rotation sensor can be corrected without having to significantly modify the conventional control system.

Second Embodiment

In the case of a resolver with a multiplication factor of angle 2×, for example, the change of electrical angle 0°-360° appears two times for one rotation of mechanical angle 0°-360°. The first embodiment is directed to identifying between the electrical angle of the first time and the electrical angle of the second time in the case of learning and correcting the accuracy during rotation. This can be employed when correction corresponding to each relevant case is carried out. It was therefore not necessary to identify the absolute position of the mechanical angle.

However, there may be a case where correction data is generated in advance at a factory or the like using a critical measurement apparatus. The critical measurement apparatus may not be included in the product per se. In such a case, the mechanical angle at the time of producing correction data must be properly set in correspondence when the correction data is to be applied to the shipping product. In other words, it is necessary to cause the mechanical angle to match between the time of producing the amendment data and the time of using the amendment data.

Figure 7:
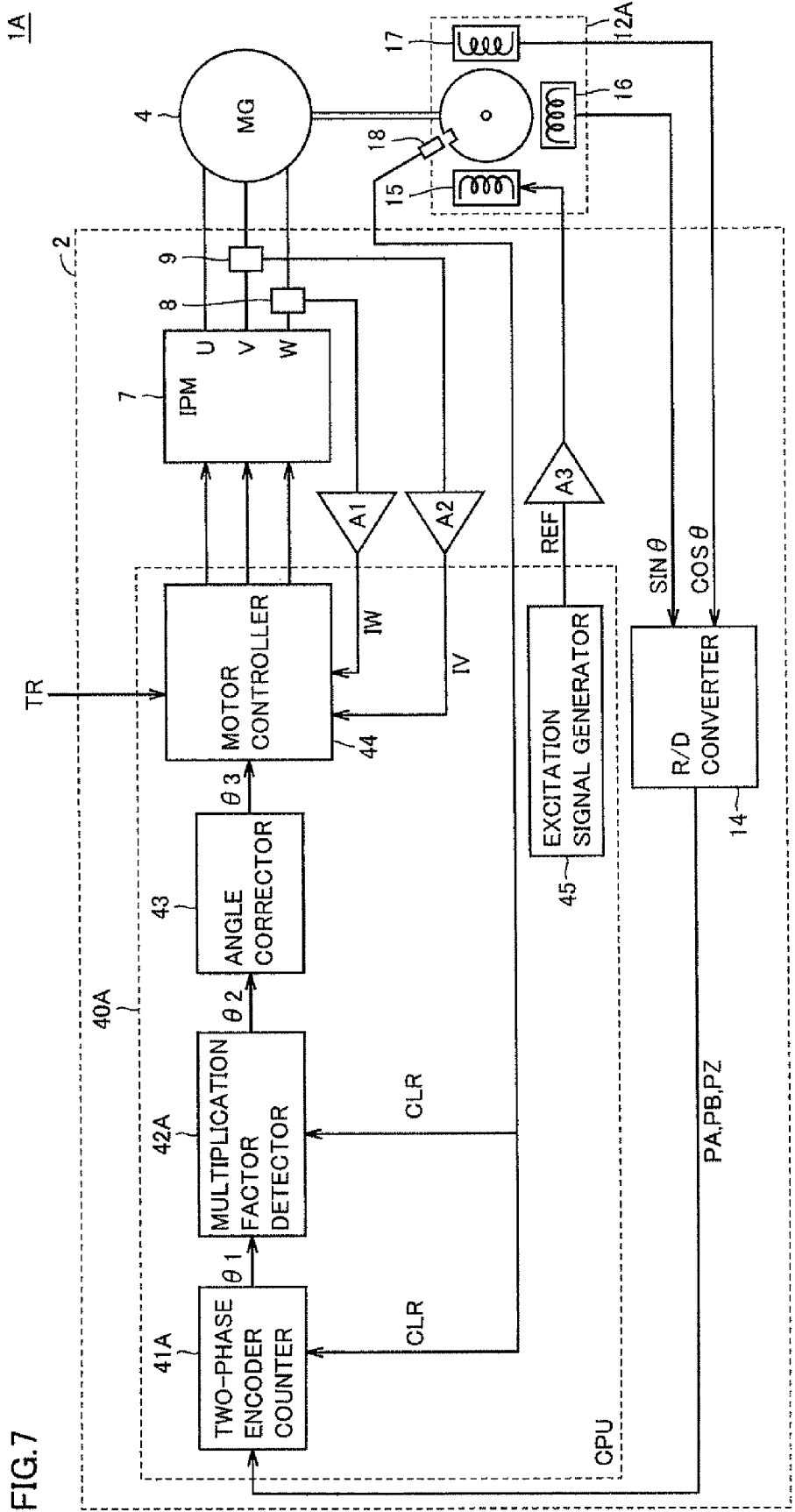
FIG. 7 is a block diagram of a vehicle 1A in which an angle of rotation detection device according to a second embodiment is employed.

FIG. 7 is a block diagram of a vehicle 1A in which an angle of rotation detection device of the second embodiment is employed.

Referring to FIG. 7, vehicle 1A differs from vehicle 1 of FIG. 1 in that a resolver 12A and a CPU 40A are provided instead of resolver 12 and CPU 40. The remaining elements are similar to those of vehicle 1 described already. Therefore, description thereof will not be repeated.

Resolver 12A includes a sensor 18 detecting the position of mechanical angle 0° of the rotor to output a clear signal CLR. Primary winding 15 and secondary windings 16 and 17 are similar to those shown in FIG. 1. Therefore, the description thereof will not be repeated.

CPU 40A differs from CPU 40 of FIG. 1 in that a two-phase encoder counter 41A and a multiplication factor detector 42A are provided instead of two-phase encoder counter 41 and multiplication factor detector 42. The remaining elements are similar to those of CPU 40, and description thereof will not be repeated.

Two-phase encoder counter 41A counts up or down according to A-phase signal PA and B-phase signal PB, and is cleared to zero in response to a clear signal CLR instead of a Z-phase signal PZ. Two-phase encoder counter 41A may be configured so as to be cleared in response to the input of either Z-phase signal PZ or clear signal CLR.

Multiplication factor detector 42A outputs a count value θ2 corresponding to the mechanical angle in consideration of the multiplication factor of angle according to a change in counter value θ1 corresponding to the electrical angle output from two-phase encoder counter 41. Multiplication factor detector 42A clears count value θ2 to zero in response to an input of a clear signal CLR.

Figure 8:
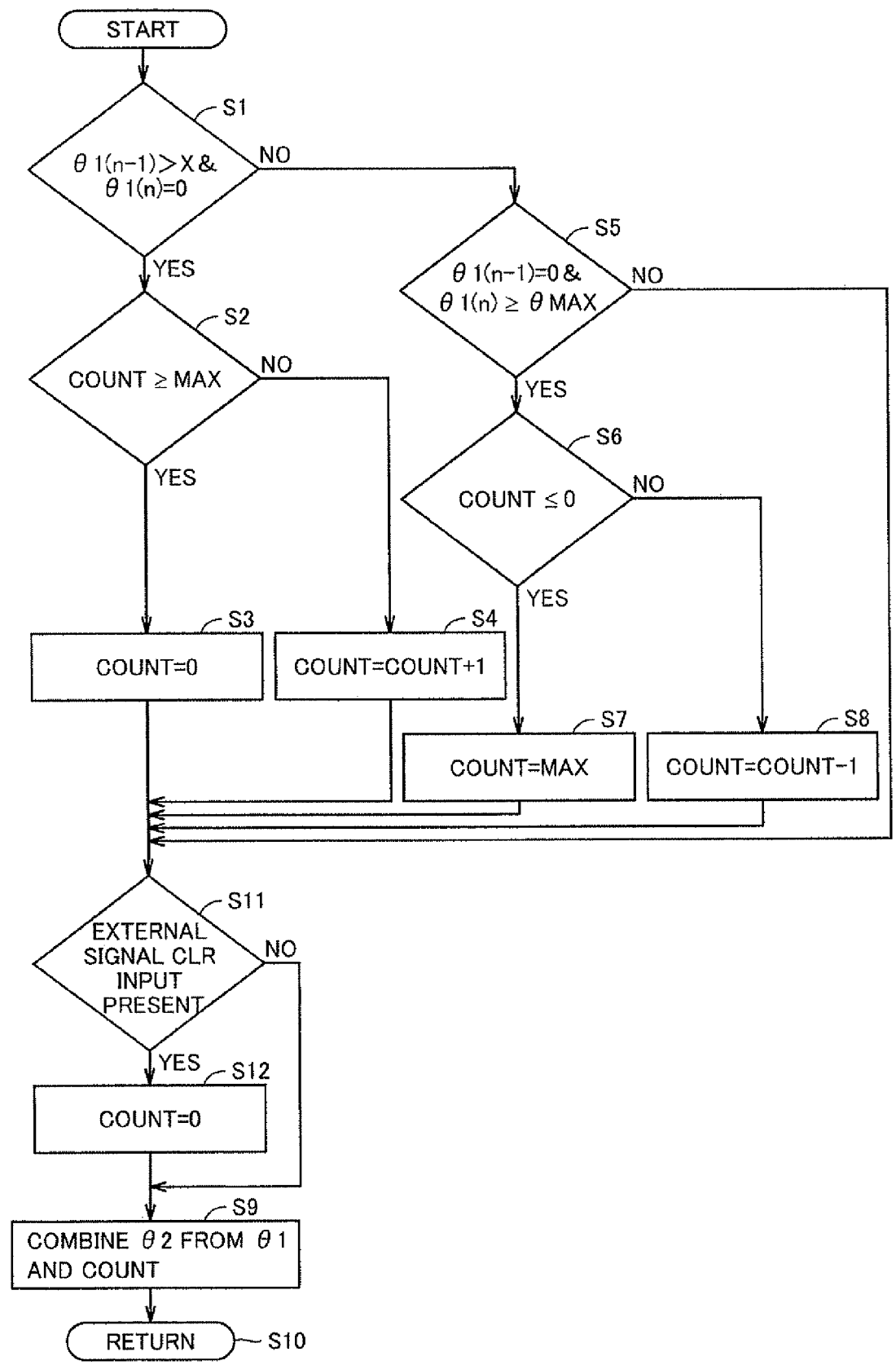
FIG. 8 is a flowchart of count control of an extended bit of a two-phase encoder counter executed by a CPU 40A according to the second embodiment.

FIG. 8 is a flowchart to describe count control of an extended bit of the two-phase encoder counter executed at step CPU 40A in the second embodiment.

The flowchart of FIG. 8 has the process of steps S1 and S12 added to the flowchart described with reference to FIG. 4. The process of steps S1-S8 is as described in association with FIG. 4. Therefore, description thereof is not repeated.

Following the end of the process of any of steps S3, S4, S7 and S8, and a determination of count value COUNT, control proceeds to step S11. At step 11, a determination is made as to whether there is an input of a clear signal CLR applied from sensor 18. In the case where there is no input of signal CLR, count value COUNT is directly employed in step S9. In contrast, when signal CLR is input, count value COUNT is cleared to zero at step S12. Then, control proceeds to step S9.

At step S9, extended count value θ2 corresponding to mechanical angle θm described in association with FIG. 3 is combined from θ1 that is the output from two-phase encoder counter 41 and count value COUNT corresponding to the extended bit.

After count value θ2 is obtained at step S9, control proceeds to step S10 to return to the main routine.

In the angle of rotation detection device of the second embodiment, the absolute position of the mechanical angle can be obtained from the two-phase encoder output from the rotary sensor. Therefore, even in the case where the correction data of the rotary sensor is produced at the factory or the like, the data can be applied to the proper position. Thus, a rotary sensor having the accuracy further improved can be realized.

The above-described first and second embodiments will be summarized hereinafter with reference again to FIGS. 1, 7, and the like.

Referring to FIG. 1, the angle of rotation detection device of the present embodiment includes an electrical angle detector (resolver 12 and R/D converter 14) having the electrical angle of 360° set smaller than the mechanical angle of 360° to output a two-phase encoder signal corresponding to the electrical angle of a rotor, a two-phase encoder counter 41 counting a two-phase encoder signal to output a digital value corresponding to the electrical angle, and a multiplication factor detector 42 detecting which position of the mechanical angle the electrical angle indicated by the signal output from the detector corresponds to based on a change in the count value of the two-phase encoder counter.

Preferably, as shown in FIG. 3, multiplication factor detector 42 generates a count value COUNT that is the high order bit of two-phase encoder counter 41 further extended to a value corresponding to the mechanical angle of 360°, and output the extended count value COUNT.

More preferably, the electric angle detector includes a resolver 12 having the electrical angle of 360° set smaller than the mechanical angle of 360°, and a resolver/digital converter 14 converting the signal of the resolver to a digital value. Resolver/digital converter 14 outputs a two-phase encoder signal including an A-phase signal, B-phase signal and Z-phase signal.

Further preferably, two-phase encoder counter 41 counts up or down according to the A-phase signal and B-phase signal, and clears the count value when a Z-phase signal is input. As shown in FIG. 4, multiplication factor detector 42 counts up the extended count value COUNT, when count value $\theta 1$ of two-phase encoder counter 41, immediately preceding a clearing of count value $\theta 1$ of two-phase encoder counter 41 performed during an increase operation of count value $\theta 1$ of two-phase encoder counter 41, exceeds a threshold value X (YES at step S1). Further, when count value $\theta 1$ exceeds threshold value X and extended count value COUNT reaches MAX (YES at step S2), the extended count value COUNT is cleared.

Further preferably, the electric angle detector also includes a sensor 18 detecting the reference position of the mechanical angle, as shown in FIG. 7. Two-phase encoder counter 41A counts up or down according to an A-phase signal and B-phase signal and clears count value $\theta 1$ in response to an output of sensor 18. Multiplication factor detector 42A clears extended count value COUNT according to an output of sensor 18 (YES at step S11 of FIG. 8).

Preferably, the angle of rotation detection device further includes an angle corrector 43 performing a correction corresponding to the proper position of the mechanical angle on the digital value output from the two-phase encoder counter, based on an output from multiplication factor detector 42.

Third Embodiment

In the angle of rotation detection device described in the first embodiment, a determination of the multiplication factor of angle is made by receiving a Z-phase signal, A-phase signal and B-phase signal output from the position detector (resolver+R/D converter, encoder, and the like). However, the determination of the multiplication factor of angle cannot be carried out properly when a Z-phase signal is input at an unexpected timing due to some cause. For example, when a Z-phase signal is input at a timing not in the vicinity of the resolver angle 0 degree, there is a possibility of the two-phase encoder counter being cleared to erroneously determine on attaining the next multiplication factor of angle.

In the third embodiment, when a Z-phase signal is generated at an unexpected timing relative to a resolver angle obtained from the Z-phase signal, A-phase signal and B-phase signal, the input of that Z-phase signal will be neglected. Further, when a Z-phase signal is generated at an unexpected timing continuously, detection of the multiplication factor of angle is carried out again.

Figure 9:
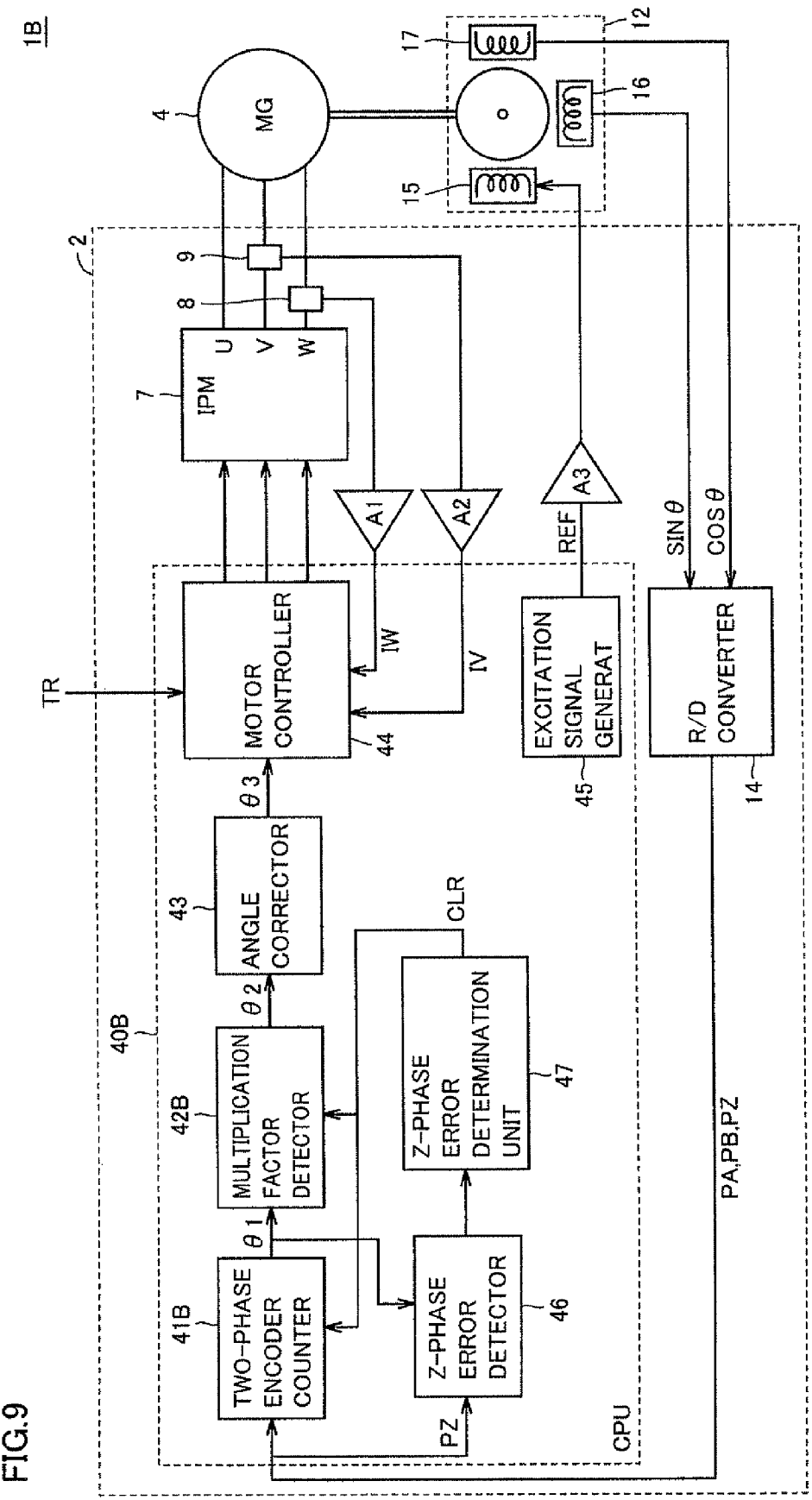
FIG. 9 is a block diagram of a vehicle 1B in which an angle of rotation detection device according to a third embodiment is employed.

FIG. 9 is a block diagram of a vehicle 1B in which the angle of rotation detection device of the third embodiment is employed.

Referring to FIG. 9, vehicle 1B has a configuration corresponding to that of vehicle 1B shown in FIG. 1, differing in that inverter device 2 includes a CPU 40B instead of CPU 40. The remaining elements in vehicle 1B are similar to those in the configuration of vehicle 1 already described. Therefore description thereof will not be repeated.

CPU 40B differs from CPU 40 of FIG. 1 in that a two-phase encoder counter 41B and a multiplication factor detector 42B are provided instead of two-phase encoder counter 41 and multiplication factor detector 42, and that a Z-phase error detector 46 and a Z-phase error determination unit 47 are further included. The remaining elements are similar to those of CPU 40. Therefore, description thereof will not be repeated.

Two-phase encoder counter 41B counts up or down count value $\theta 1$ according to A-phase signal PA and B-phase signal PB, and clears the value according to a Z-phase signal PZ. Multiplication factor detector 42B outputs a count value $\theta 2$ corresponding to the mechanical angle taking into account the multiplication factor of angle, in response to a change of count value $\theta 1$ corresponding to the electrical angle output from two-phase encoder counter 41B. Specifically, the multiplication factor of angle counter is increased/increased according to the carry or borrow of two-phase encoder counter 41B.

Z-phase error detector 46 takes the Z-phase signal as proper and improper when count value $\theta 1$ is input within an appropriate range and outside the appropriate range, respectively. In other words, discrimination is made between a Z-phase signal at the expected timing and a Z-phase signal at an unexpected timing.

Z-phase error determination unit 47 counts the number of times a Z-phase signal is input at an unexpected timing to determine an error state. Specifically, Z-phase error determination unit 47 counts the number of Z-phase signals detected to be in error by Z-phase error detector 46, and outputs a clear signal CLR when the count value exceeds an error limit value. Clear signal CLR causes the value held by two-phase encoder counter 41B and multiplication factor detector 42B to be cleared to zero.

Figure 10:
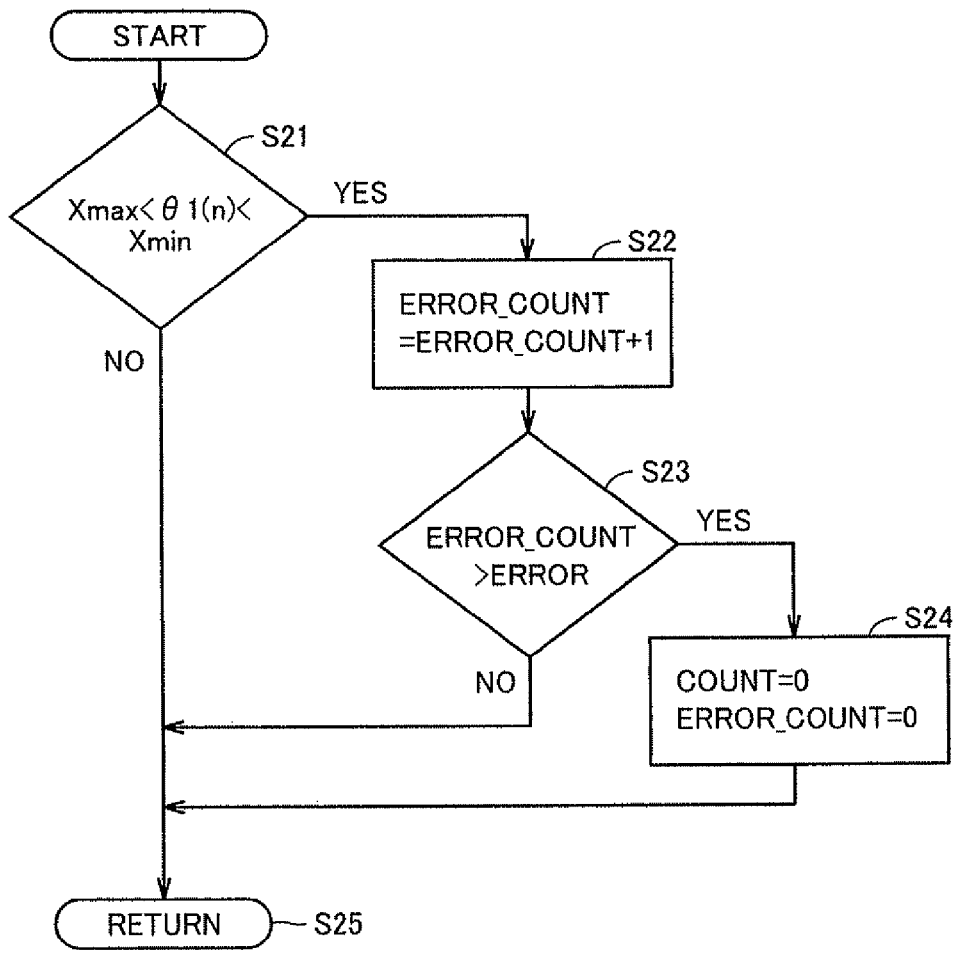
FIG. 10 is a flowchart to describe a process executed according to the third embodiment.

FIG. 10 is a flowchart to describe the process carried out in the third embodiment. The process in the flowchart is executed in addition to the process of FIG. 4 described in the first embodiment, and is executed every time a Z-phase signal PZ is applied to Z-phase error detector 46.

At step S21 of FIG. 10, a determination is made as to whether the value of count value $\theta$ at the input timing of Z-phase signal PZ satisfies the condition of Xmax<$\theta 1$ (n)<Xmin. Here, "n" represents that the process of the flowchart is executed the nth time. The count value when the process of this flowchart is executed at the next time will be represented as $\theta 1$ (n+1).

Figure 11:
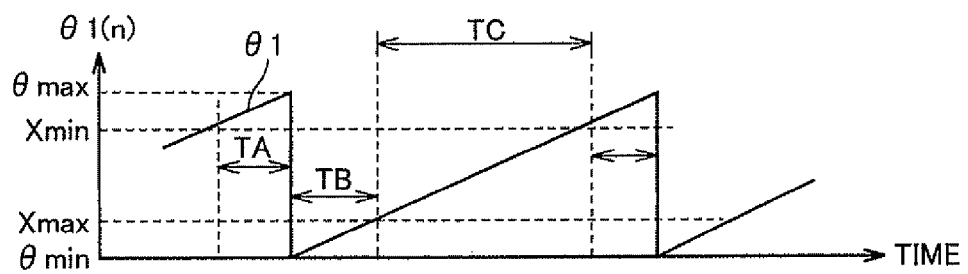
FIG. 11 is a diagram to describe Xmax, Xmin of FIG. 10.

FIG. 11 is a diagram to describe Xmax, Xmin shown in FIG. 10.

The term during which the value of count value $\theta 1$ (n) is greater than or equal to Xmin and less than or equal to $\theta$max is represented as TA; the term during which count value $\theta 1$ (n) is greater than or equal to $\theta$min and less than or equal to Xmax is represented as TB; and the remaining term is represented as TC. Xmax represents the Z-phase input proper determination threshold value in the vicinity of +0 degree. Xmin represents the Z-phase input proper determination threshold value in the vicinity of −0 degree.

Although Z-phase signal PZ should be output from R/D converter 14 when essentially $\theta 1$ (n)=$\theta$max, there is a case where deviation occurs between count value $\theta 1$ and Z-phase signal PZ by some cause. For example, a Z-phase signal may be output with a deviation between the actual electrical angle and the angle identified by the angle detector due to an error in the angle detector (encoder, resolver, or R/D converter), or in a constituent component (wire, or connector) of the angle detector. Alternatively, a Z-phase signal may be output with a deviation between the actual electrical angle and the angle identified by the angle detector due to some noise. Overlapping of the electric noise on the Z-phase signal itself is another possible event.

A Z-phase signal input during term TA or term TB is taken to be proper and a Z-phase signal input at other term TC is taken to be improper. Two-phase encoder counter 41B has its value cleared by a Z-phase signal taken to be proper, and not by a Z-phase signal taken to be improper.

When a Z-phase signal is input repeatedly during the error term TC, count value θ1 of two-phase encoder counter 41B is also not reliable. Therefore, the number of times an improper Z-phase signal is generated is counted. When the counted time is greater than a predetermined value, control is effected such that two-phase encoder counter 41B is cleared and count value COUNT of the extended bit counted by multiplication factor detector 42B is also cleared.

Referring to FIG. 10 again, when condition Xmax<θ1(n)<Xmin is not established at step S21 (when a Z-phase signal PZ is input during term TA or TB of FIG. 11), control proceeds to step S25 to return to the main routine.

When condition Xmax<θ1 (n)<Xmin is established at step S21 (when a Z-phase signal PZ is input during term TC of FIG. 11), control proceeds to step S22.

At step S22, +1 is added to count value ERROR_COUNT indicating the input at a Z-phase error timing. Count value ERROR_COUNT represents the count of a Z-phase signal PZ input during term TC of FIG. 11.

At step S23, a determination is made as to whether count value ERROR_COUNT exceeds an error determination threshold value ERROR or not. When ERROR_COUNT>ERROR is established, control proceeds to step S24, otherwise, control proceeds to step S25 to return to the main routine. Error determination threshold value ERROR may take any integer greater than or equal to 1. In the case where error determination threshold value ERROR=1 is set, count value COUNT will be reset at any input of a Z-phase signal PZ during term TC of FIG. 11. Generally, error determination threshold value ERROR is set to a value greater than or equal to 2. A reset operation is to be performed when a Z-phase signal PZ is input more than once during period TC of FIG. 11 with the generation of signal Z-phase signal PZ caused by noise being neglected.

At step S24, count value COUNT from multiplication factor detector 42B is cleared to zero. At the same time, count value ERROR_COUNT is also cleared to zero. Then, control proceeds to step S25 to return to the main routine.

In summarization, angle of rotation detection device of FIG. 9 according to the third embodiment includes an angle detector (12, 14) having the angle corresponding to one period of an output signal set smaller than the mechanical angle of 360°, a counter (41B) providing a digital value output corresponding to the output signal from the angle detector, and a multiplication factor detector 42B detecting which position of the mechanical angle the angle indicated by the signal output from the angle detector corresponds to, based on a change in the count value from the counter (41B).

Preferably, the angle detector is an electrical angle detector (12, 14), having the electrical angle of 360° smaller than the mechanical angle of 360°, and providing a two-phase encoder signal output corresponding to the electrical angle of the rotor. The counter is a two-phase encoder counter 41B counting a two-phase encoder signal to output a digital value θ1 corresponding to the electrical angle. Multiplication factor detector 42B detects which position of the mechanical angle the electrical angle indicated by the signal output from the electrical angle detector corresponds to, based on a change in the count value from two-phase encoder counter 41B.

More preferably, multiplication factor detector 42B generates a count value θ2 that is the high order bit of two-phase encoder counter 41B further extended to a value corresponding to the mechanical angle of 360°, and outputs the extended count value.

More preferably, two-phase encoder counter 41B counts up or counts down according to an A-phase signal and B-phase signal, and clears the count value in response to an input of a Z-phase signal. The angle of rotation detection device includes a Z-phase error detector 46 determining whether the count value of two-phase encoder counter 41B at the time of a Z-phase signal being input is within a predetermined range corresponding to an error timing (within term TC of FIG. 11), and a Z-phase error determination unit 47 counting the number of input Z-phase signals when a determination is made of being within a predetermined range by Z-phase error detector 46, and when the Z-phase signal input Count ERROR_COUNT exceeds error count threshold value ERROR (YES at step S23), extended count value θ2 and extend bit COUNT held by multiplication factor detector 42B are cleared.

In the third embodiment, the event of a Z-phase signal being repeatedly input at an erroneous timing is detected, and the counter is cleared accordingly. Therefore, the possibility of normal return becomes higher even in the case of erroneous operation.

Fourth Embodiment

The first to third embodiments are based on an example employing a resolver for a rotor position detection device. The case where a Hall element is employed for the rotor position detection device will be described hereinafter.

Figure 12:
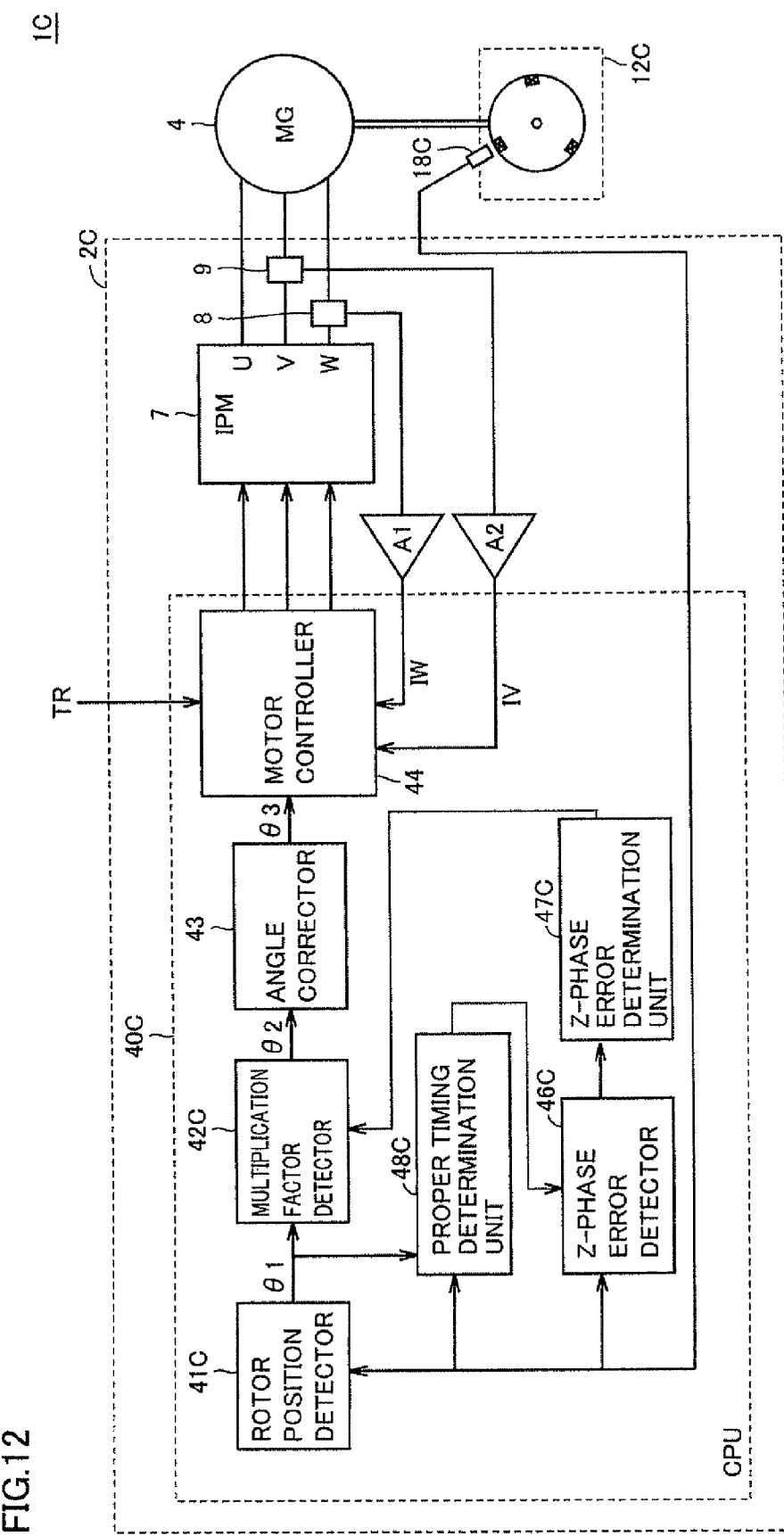
FIG. 12 is a block diagram of a vehicle 1C in which an angle of rotation detection device according to a fourth embodiment is employed.
Figure 13:
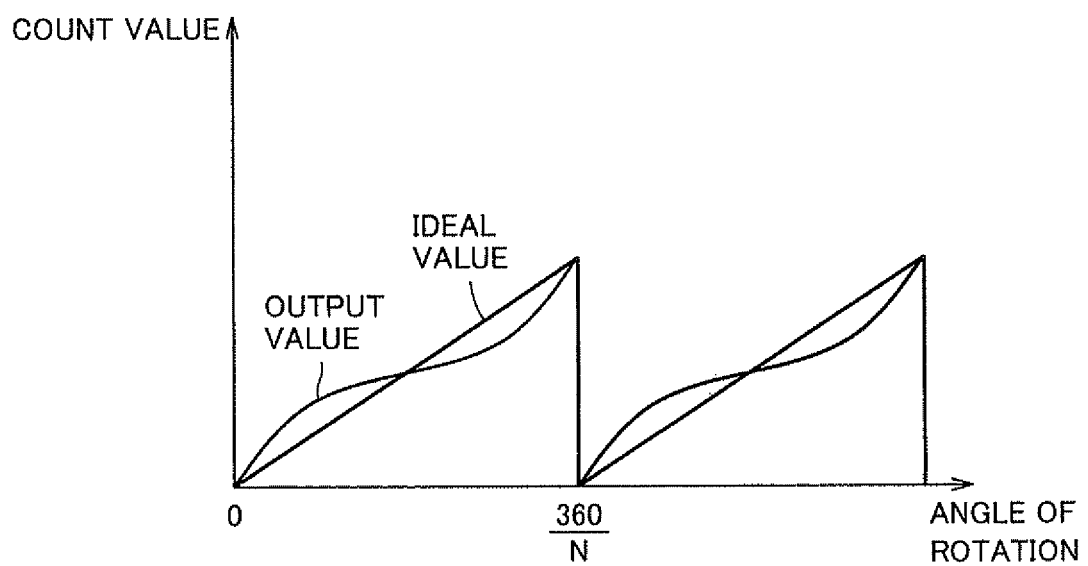
FIG. 13 is a diagram to describe correction of the property of a resolver.

FIG. 12 is a block diagram of a vehicle 1C in which an angle of rotation detection device according to a fourth embodiment is employed. In FIG. 12, a signal corresponding to a Z-phase signal is input by a Hall element 18C.

Referring to FIG. 12, vehicle 1C includes an inverter device 2C, a motor generator 4, and a rotor position detector 12C connected to the rotor shaft of the motor generator. In the case where vehicle 1C is an electrical car, hybrid vehicle, or a fuel cell vehicle, motor generator 4 may be employed to drive the wheels. Motor generator 4 may also be employed for another usage.

A rotor position detector 12C includes a Hall element 18C detecting the position of a magnet embedded in a rotor, fixed to a rotary shaft of motor generator 4.

Inverter device 2C includes a CPU 40C, an IPM 7, and current sensors 8 and 9. IPM 7 includes a power switching device such as an IGBT to control the current flow to the stator coil of the motor generator. The stator coil of the motor generator includes coils of the U-phase, V-phase and W-phase. Since the U-phase, V-phase and W-phase coils are arranged in wye configuration, the current of the U-phase can be obtained through calculation by measuring the currents of the V-phase and W-phase through current sensors 8 and 9.

CPU 40C includes a rotor position detector 41C, a multiplication factor detector 42C, an angle corrector 43, a motor controller 44, a proper timing determination unit 48C, a Z-phase error detector 46C, and a Z-phase error determination unit 47C. Angle corrector 43 and motor controller 44 carry out an operation similar to that described in the first embodiment. Therefore description thereof is not repeated.

In the case where a Hall element is employed, the actual angle cannot be directly detected since the resolution of the sensor is low. Therefore, it is assumed that the motor rotation will not suddenly change, and rotor position detector 41C estimates the angle from the rotational speed obtained from the input interval between Z-phase signals, and the elapsed time from the last Z-phase signal input.

Specifically, rotor position detector 41C includes a timer counter counted up through a clock signal of CPU 40C or the like and cleared in response to a Z-phase signal from Hall element 18C. The timer counter value immediately before being cleared is stored as a value C0 corresponding to 360°. The ratio between the stored value C0 and the count value C is multiplied by 360° to calculate a count value θ1 corresponding to the electrical angle. Namely, θ1=C/C0×360.

A proper timing determination unit 48C calculates the input term during which input of the next Z-phase is expected (expected input term), and outputs a signal indicating whether the current time corresponds to the calculated expected input term to Z-phase error detector 46C. The expected input term corresponds to term TA+TB of FIG. 11.

Z-phase error detector 46C detects an error in the Z-phase signal based on whether the Z-phase signal from Hall element 18C is input during the expected input term or not. A Z-phase signal input during term TC shown in FIG. 11 is determined to be an error signal and neglected. In this case, an output signal indicating that an error signal is input is provided to Z-phase error determination unit 47C.

Z-phase error determination unit 47C carries out an error determination based on the number of detections or the continuing time from the output result of Z-phase error detector 46C. For example, in the case where the number of detected error signals within a predetermined term exceeds error threshold value ERROR_COUNT, a determination may be made of an error.

Z-phase error determination unit 47C clears the counter of multiplication factor detector 42C when a determination is made that the Z-phase signal is in error.

The angle of rotation detection device of the fourth embodiment includes an angle detector (18C) having the angle corresponding to one period of an output signal set smaller than the mechanical angle of 360°, a counter (rotor position detector 41C) providing a digital signal corresponding to the output signal from the angle detector, and a multiplication factor detector 42C detecting what position of the mechanical angle the angle indicated by the signal output from the angle detector corresponds to based on a change in count value θ1 of the counter (rotor position detector 41C).

Preferably, the angle detector (18C) is a Hall element configured to output a signal indicating completion of one period at every predetermined angle as an output signal. The counter includes a rotor position detector 41C counting up a count value based on a clock signal during a period starting from input of an output signal to the input of the next output signal. The angle of rotation detection device includes a Z-phase error detector 46C determining whether the count value from the counter (rotor position detector 41C) at the point in time the output signal is input is within a predetermined range corresponding to an error timing or not, and a Z-phase error determination unit 47C counting the number of input output signals when a determination is made of being within the predetermined range by Z-phase error detector 46C, and when the number of input output signals exceeds an error count threshold value, clearing the extended count value held by multiplication factor detector 42C.

Likewise with the third embodiment, the fourth embodiment detects the event of a Z-phase signal being input at an error timing repeatedly to have the counter cleared in such a case. Therefore, the possibility of normal return becomes higher even in the event of an erroneous operation.

It will be understood that the embodiments of the present invention disclosed herein are by way of example only, and is not to be taken by way of limitation in all aspects. The scope of the present invention is defined, not by the description set forth above, but by the appended claims, and all changes that fall within limits and bounds of the claims, or equivalence thereof are intended to be embraced by the claims.

REFERENCE SIGNS LIST 1, 1A-1C vehicle; 2 inverter device; 4 motor generator; 7 IPM; 8 current sensor; 12, 12A resolver; 14 R/D converter; 15 primary winding; 16, 17 secondary winding; 18 sensor; 40, 40A-40C CPU; 41, 41A, 41B two-phase encoder counter; 41C rotor position detector; 42, 42A-42C multiplication factor detector; 43 angle corrector; 44 motor controller; 45 excitation signal generator; 180 mechanical angle; A1-A3 amplifier.

The invention claimed is:

1. An angle of rotation detection device comprising:
an electrical angle detector having an electrical angle of 360° corresponding to one period of an output signal set smaller than a mechanical angle of 360° and providing a two-phase encoder signal corresponding to an electrical angle of a rotor;
a two-phase encoder counter counting said two-phase encoder signal, said two phase encoder counter having a digital value corresponding to said electrical angle of 360° as a maximum counting value; and
a multiplication factor detector detecting which position of the mechanical angle an angle indicated by a signal output from said electrical angle detector corresponds to, based on a change of a count value of said two-phase encoder counter, wherein
said multiplication factor detector generates, based on a change of a count value of said two-phase encoder counter, an extended count value for extending a number of bits of said two-phase encoder counter which can express at most a value corresponding to the electrical angle of 360° to the number of bits which can express a value corresponding to the mechanical angle of 360°, and outputs said extended count value as a value showing which position of the mechanical angle the electrical angle indicated by the signal output from said electrical angle detector corresponding to, and an upper limit of said extended count value corresponding to a multiplication factor of said electrical angle detector.

2. The angle of rotation detection device according to claim 1, wherein
said electrical angle detector includes
a resolver having the electrical angle of 360° set smaller than the mechanical angle of 360°, and
a resolver/digital converter converting a signal of said resolver into a digital value,
said resolver/digital converter outputs said two-phase encoder signal including an A-phase signal, a B-phase signal and a Z-phase signal.

3. The angle of rotation detection device according to claim 2, wherein
  said two-phase encoder counter counts up or counts down according to said A-phase signal and said B-phase signal, and clears the count value when said Z-phase signal is input,
  said multiplication factor detector counts up said extended count value when the count value of said two-phase encoder counter, immediately preceding a clearing of the count value of said two-phase encoder counter performed during an increase operation of the count value of said two-phase encoder counter, exceeds a threshold value, and said Z-phase signal is a signal output at the reference position of said electrical angle.

4. The angle of rotation detection device according to claim 2, wherein
  said electrical angle detector further includes a sensor detecting a reference position of the mechanical angle,
  said two-phase encoder counter counts up or down according to said A-phase signal and said B-phase signal, and clears the count value according to an output of said sensor,
  said multiplication factor detector clears said extended count value according to an output of said sensor.

5. The angle of rotation detection device according to claim 1, further comprising an angle corrector performing a correction corresponding to a proper position of the mechanical angle on the digital value output from said two-phase encoder counter, based on an output from said multiplication factor detector.

* * * * *